March 1, 1966 A. BOPP ETAL 3,238,300

DELAY LINE

Filed Oct. 1, 1964

Inventors:
Achim Bopp
Gerhard Krause
by Michael J. Striker
Attorney

United States Patent Office 3,238,300
Patented Mar. 1, 1966

3,238,300
DELAY LINE

Achim Bopp, Furtwangen, and Gerhard Krause, Darmstadt, Germany, assignors to Fernseh G.m.b.H., Darmstadt, Germany Filed Oct. 1, 1964, Ser. No. 400,866
Claims priority, application Germany, Oct. 5, 1963, F 40,923
3 Claims. (Cl. 178—69.5)

The present invention relates to delay line control and particularly to video signal delay line control.

It is known to use capacitatively variable components as elements of a delay line and to insert these between the junctions of a first and a second electronic amplifier connected in series. Thus the delay is not only dependent upon a control signal, but also upon the signal being delayed. In this way the signal effects amplitude-dependent delay variations disturbing for example the transmission of a NTSC color signal.

It is a broad object of the present invention to provide a novel delay line control avoiding the disadvantage of known apparatus.

It is a further object of the present invention to provide a novel arrangement for controlling the delay of a video signal generated by means of a magnetic tape recorder.

It is still a further object of the present invention to provide a novel arrangement for controlling the delay of a NTSC color signal without causing differential phase errors.

According to the present invention a video signal is transmitted via several switching circuits connected in series. Each of these switching circuits comprises elementary delay-line members effecting different delays. By means of associated switches different combinations of elementary delay-line members may be inserted in the transmission path. There is further provided an error detector generating an analogue control signal depending upon the phase difference between a reference signal and said video signal. By means of an analogue-digital converter combinations of associated digital control signals are generated which effect the opening and closing of said switches controlling the delay of said video signal and thus decreasing the phase difference between said reference signal and said video signal.

It is an important feature of the present invention that no alterations are made as regards the inductivities and the capacities of the elementary delay-line members and switches. Thus no amplitude-dependent delay changes are to be expected. This advantage is particularly important for the transmission of color television signals according to the NTSC system.

It is favorable to select the size of the elementary delay-line members of the individual switching circuits such that their delays may be represented in the form of a geometrical progression with the quotient of 2. In this case the various delays of the total delay line differ from one another by a constant delay-line difference, and a relatively large range is covered.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

In all these drawings corresponding elements are designated by the same reference symbols.

Figure 1:
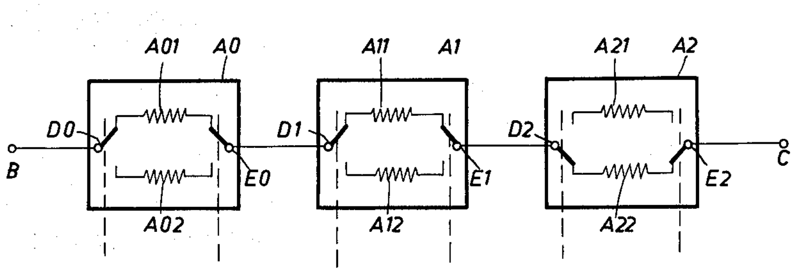
FIG. 1 is a schematic representation of a controllable delay line.

FIG. 1 shows the input terminal B, the switching circuits A0, A1, A2 . . . connected in series and the output terminal C. For the sake of simplicity only three switching circuits are represented in the figure. The switching circuit A0 (and in a similar way also the other switching circuits A1, A2 . . .) consists of a first elementary delay-line member A01, of a second elementary delay-line member A02 and of the controllable switches D0, E0. A signal applied by way of terminal B is transmitted to the second switching circuit A1 either by way of the first elementary delay-line member A01 or by way of the second elementary delay-line member A02. Since the delays of the first and second elementary delay line members differ substantially from one another, the delay of the switching circuit A0 may be altered. In this way the delays of all switching circuits A0, A1, A2 . . . may be altered, and the total delay of the whole configuration may be controlled.

Figure 2:
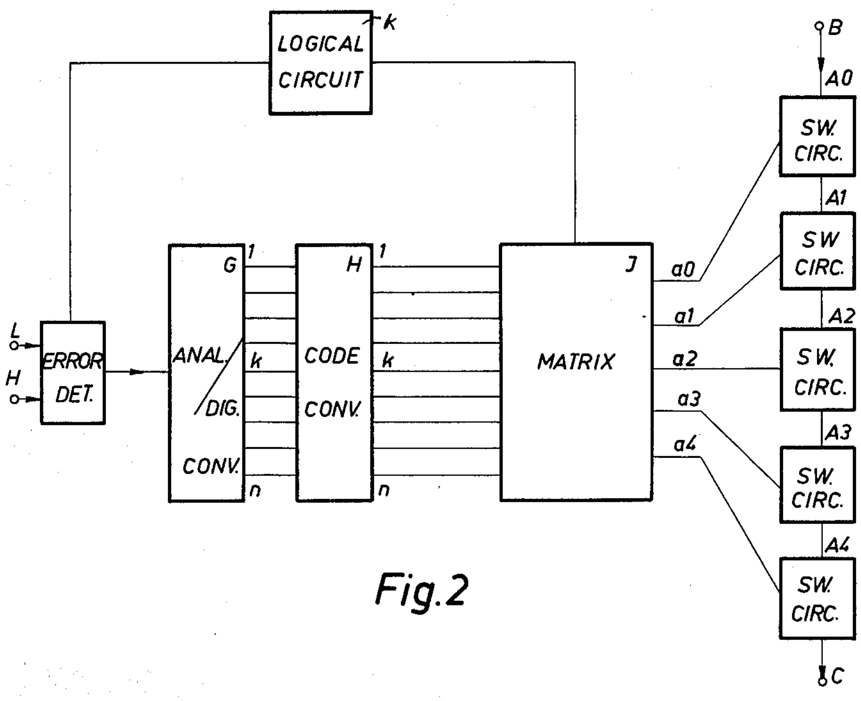
FIG. 2 is a block circuit diagram of an arrangement for controlling the delay line.

The block circuit diagram according to FIG. 2 shows an arrangement using the described switching circuits A0, A1, A2, A3, A4. This arrangement consists of the error detector F, of the analogue-digital converter G, of the code-converter H, of a further code-converter in the form of a matrix J, of the logical circuit K and of the circuits A0, A1, A2, A3, A4. By way of the terminals L and M respectively there are applied signals representing the nominal value and the actual value respectively of these signals. For example, there may be transmitted on the one hand a reference video signal and on the other hand a temporarily phase-shifted video signal in relation with the reference video signal. By way of the output of the error detector F an analogue control signal is supplied to the input of the converter G. Combinations of digital control signals depending upon this analogue control signal are derived and used for controlling the switching circuits A0, A1 . . . .

According to the actual amplitude of the analogue control signal the analogue-digital converter G supplies at the outputs 1, 2 . . . $k$ a signal having an amplitude value 1 and at the remaining outputs $n-k$ a signal having an amplitude value 0.

The following code-converter H with the program "1 out of $n$" supplies only at one of its outputs, that is at the output $k$, a signal with an amplitude value 1 and at the remaining $n-1$ outputs a signal with an amplitude value 0. To each output of this code-converter H there is clearly associated a partial range of the analogue control signal.

The matrix J translates the "1 out of $n$"-code into a dual code. The outputs $a0$, $a1$, $a2$, $a3$, $a4$ of this matrix J are conductively connected to corresponding switching circuits A0, A1 . . . .

The analogue control signal is thus divided into $n$ partial ranges, and to each of these partial ranges there is associated a defined combination of digital control signals, which are supplied by way of the outputs $a0$ to $a4$ of the matrix J controlling the switches D0, E0, D1, E1 . . . of the switching circuits A0 to A4.

When the delay $t_m$ (of the elementary delay-line members A01, A11, A21, A31 . . .) is equal to $$2^m t' (m=0 \dots i)$$

then the resultant total delay T for each switching combination is equal to the sum of the individual delays.

$$T=b_0 2^0 t'+b_1 2^1 t'+b_2 2^2 t'+\dots \quad (1)$$

($b_i=0$ or 1).

The total delay T depends upon the actual combination of the digital control signals. The smallest delay difference corresponds to the amount of the first member of the Equation 1, that is $t'$.

In a preferred embodiment $t'$ is equal to 30 nsec and $i=4$. By this 32 different values of total delays T can be achieved. If $T_{max}$ means the maximum total delay:

$$T_{max}=(2^{i+1}-1)t'=31\cdot 30 \text{ nsec}=930 \text{ nsec} \quad (2)$$

Each value of the analogue control signal shall release one and only one combination of digital control signals. The analogue control signal shall thus effect digital control signals, to each of which there is associated a defined partial range of the analogue control signal. These partial ranges are not to overlap. In order to avoid that in the gaps between the partial ranges no digital control signals are supplied, there is provided the logical circuit K. This circuit K is connected between the matrix J and the error detector F. A specific digital signal is applied to this logical circuit indicating whether or not digital control signals are present at the outputs $a0$ to $a4$ of the matrix J. If no digital control signals are present, the analogue control signal is raised by the circuit K until again a digital control signal is present.

While the invention has been illustrated and described as embodied in an arrangement for controlling the delay of a video signal it is not intended to be limited to the details shown, since various modifications and structural changes may be made without departing in any way from the spirit of the present invention.

What is claimed as new and desired to be secured by Letters Patent is:

1. Arrangement for controlling the delay of a video signal comprising, in combination, a plurality of switching circuits having one input and one output each; a plurality of first elementary delay-line members one for each of said switching circuits; a plurality of second elementary delay-line members one for each of said switching circuits, said first elementary delay-line members and said second elementary delay-line members effecting different delays; a plurality of switches associated with said switching circuits having a first switching position and a second switching position each and conductively connecting said inputs respectively of said switching circuits via said first elementary delay-line members to said outputs respectively of said delay-line members during said first switching position and conductively connecting said inputs respectively of said switching circuits via said second elementary delay-line members to said outputs respectively during said second switching position; connection means connecting said switching circuits in series; connection means applying said video signal to said input of the first one of said switching circuits; a generator generating a reference signal; an error detector producing an analogue control signal depending upon a phase difference between two signals applied to its inputs respectively; connection means connecting the output of said generator to one input of said error detector; connection means applying said video signal to a second input of said error detector; an analogue-digital converter deriving from said analogue control signal combinations of associated digital control signals effecting said first respectively second position of said switches and thus decreasing said phase difference.

2. Arrangement according to claim 1, comprising a logical circuit connected between said analogue-digital converter and said error detector raising said analogue control signal at the absence of digital control signals such that again a digital control signal is present.

3. Method for controlling the delay of a video signal, comprising the steps of transmitting a video signal via a plurality of switching circuits effecting different delays; generating a reference signal; producing an analogue control signal depending upon a phase difference between said video signal and said reference signal; deriving from said analogue control signal combinations of associated digital control signals; switching said switching circuits and decreasing the phase difference between said video signal and said reference signal.

References Cited by the Examiner

UNITED STATES PATENTS

| | | | |
|---|---|---|---|
| 3,071,739 | 1/1963 | Runyon | 333—18 |
| 3,202,769 | 8/1965 | Coleman | 178—6.6 |

DAVID G. REDINBAUGH, *Primary Examiner.*

J. McHUGH, *Assistant Examiner.*